US 6,584,271 B2

(12) United States Patent
Shi et al.

(10) Patent No.: US 6,584,271 B2
(45) Date of Patent: Jun. 24, 2003

(54) DUAL FIBER VARIABLE OPTICAL ATTENUATOR

(75) Inventors: Zhupei Shi, San Jose, CA (US); Yuqiao Liu, Sunnyvale, CA (US); Jay Dehkordi, San Jose, CA (US); Minh Tran, Stockton, CA (US); Peter C. Chang, Mountian View, CA (US); Lee Zhang, Union City, CA (US)

(73) Assignee: Alliance Fiber Optics Products, Inc., Sunnyvale, CA (US)

( * ) Notice: Subject to any disclaimer, the term of this patent is extended or adjusted under 35 U.S.C. 154(b) by 164 days.

(21) Appl. No.: 09/734,064

(22) Filed: Dec. 9, 2000

(65) Prior Publication Data

US 2003/0091318 A1 May 15, 2003

(51) Int. Cl.[7] .................................................. G02B 6/00
(52) U.S. Cl. ......................................... 385/140; 385/33
(58) Field of Search .......................................... 385/140

(56) References Cited

U.S. PATENT DOCUMENTS

| | | | | | |
|---|---|---|---|---|---|
| 5,832,153 | A | * | 11/1998 | Duck | 385/34 |
| 6,130,984 | A | * | 10/2000 | Shen et al. | 385/140 |
| 6,137,941 | A | * | 10/2000 | Robinson | 385/140 |
| 6,144,794 | A | * | 11/2000 | Mao et al. | 385/140 |
| 6,266,474 | B1 | * | 7/2001 | Han et al. | 385/11 |
| 6,304,709 | B1 | * | 10/2001 | Fujita | 385/140 |
| 6,340,248 | B1 | * | 1/2002 | Naor | 385/52 |

* cited by examiner

*Primary Examiner*—Michael P. Stafira
*Assistant Examiner*—Juan D Valentin, II (57) ABSTRACT

A variable optical attenuator (200) comprises a dual fiber collimator (202) and a reflection component (206) separated by a linear moveable ND filter (204). The collimator (202) includes a ferrule (304) with dual fibers (310, 320) therein, and a GRIN lens (302) spaced from the ferrule (304) with a distance in compliance with the distance between the reflection component (206) and the GRIN lens (302).

19 Claims, 7 Drawing Sheets

DUAL FIBER VARIABLE OPTICAL ATTENUATOR

BACK GROUND OF THE INVENTION

1. Field of the Invention

The invention relates to the field of optical power regulators for fiber optic network, and particularly to a dual fiber variable optical attenuator.

2. The Related Art

A fiber optical attenuator is an optical component that is intended to control the optical power propagating in the fiber. Optical attenuators are widely used in the optical transmission system and the optical network, and especially in the optical wavelength division multiplexing (WDM) network. The motor driven optical variable attenuator is a new kind of related device used in the WDM network.

U.S. Pat. No. 5,745,634 discloses a costly design using two lens for optical coupling and using a normal DC motor to control the motion.

Differently, the copending application Ser. No. 09/174,367 having the same assigned with the instant application, discloses a systematic design where a neutral density (ND) filter is placed between two collimators, and a step motor is employed to electrically control the position of the ND filter for obtaining the specific attenuation value. Under this situation, the input and the out put fibers are respectively positioned on two sides of the whole package box.

As noted, in the WDM optical network system arrangement, it is preferred to have the input fiber and the corresponding output fiber extend on the same side for compact size consideration. Thus, the copending application Ser. No. 09/255,915 also having the same assignee with the instant application, demonstrates the architecture of duel fiber collimator optical variable attenuator, where both the input fiber and the output fiber are located on one side of the whole package.

Anyhow, it is noted because in the copending 09/255,915 design, the reflection of the light occurs on the ND fiber which is actuated/controlled by the step motor. In practice, this type of design may create attenuation instability due to relatively great tolerance/oscillation of the motor motion which results in the inferior reflection effect.

Therefore, an object of the invention is to provide a variable optical attenuator not only with a compact size but also very good reliability performance being not influenced by the motion of the step motor.

SUMMARY OF THE INVENTION

According to an aspect of the invention, a variable optical attenuator comprises a dual fiber collimator and a reflecting component separated by a linearly moveable ND filter wherein said ND filter is either manually controlled or electrically controlled by a step motor.

Another feature of the invention provides significant spacing between the GRIN lens and the reflecting component (such as a mirror) to place the ND filter in between.

Another feature of the invention provides spacing between the ND filter and the reflecting component to have the focal point of the GRIN lens located on the reflecting component.

Another feature of the invention provides a lateral offset between the axis of the ferrule, a mechanical part, and that of the GRIN lens so as to efficiently capture the reflected light from the reflecting component and the ND filter.

DETAILED DESCRIPTION OF THE PREFERRED EMBODIMENTS

References will now be in detail to the preferred embodiments of the invention. While the present invention has been described in with reference to the specific embodiments, the description is illustrative of the invention and is not to be construed as limiting the invention. Various modifications to the present invention can be made to the preferred embodiments by those, skilled in the art without departing from the true spirit and scope of the invention as defined by appended claims.

It will be noted here that for a better understanding, most of like components are designated by like reference numerals throughout the various figures in the embodiments. Attention is directed to FIGS. 1–4 wherein the miniature VOA (variable optical attenuator) 200 comprises a dual fiber collimator 202, a high reflection mirror 206, and an ND filter 204 therebetween, wherein the collimator 202 and the mirror 206 are both immoveably mounted to a substrate 208 in the case 216, while the ND filter 204 is moveably received within the substrate 208 along a transverse direction relative to the axis direction of the collimator 202 or of the reflection mirror 206.

Figure 1:
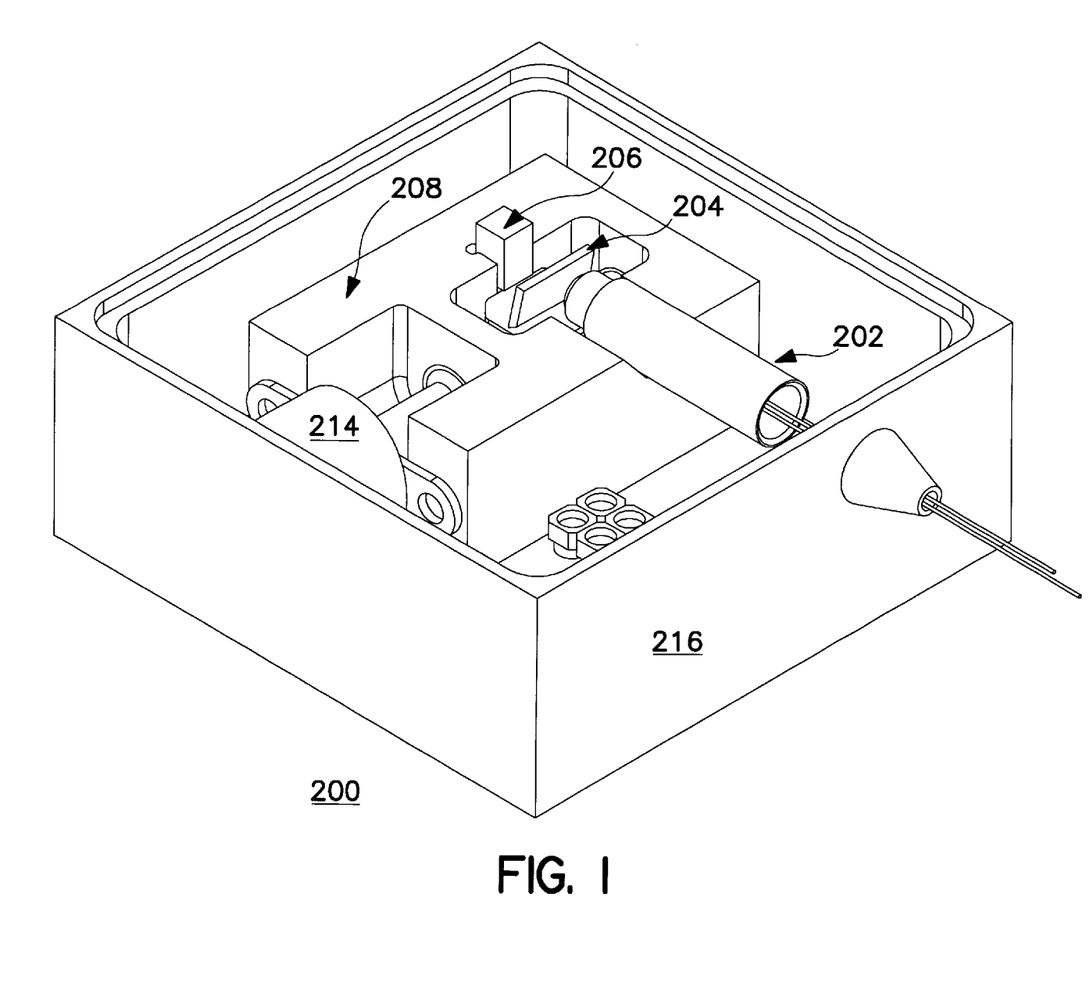
FIG. 1 is a schematic diagram of a preferred embodiment of a variable optical attenuator, according to the invention.
Figure 2:
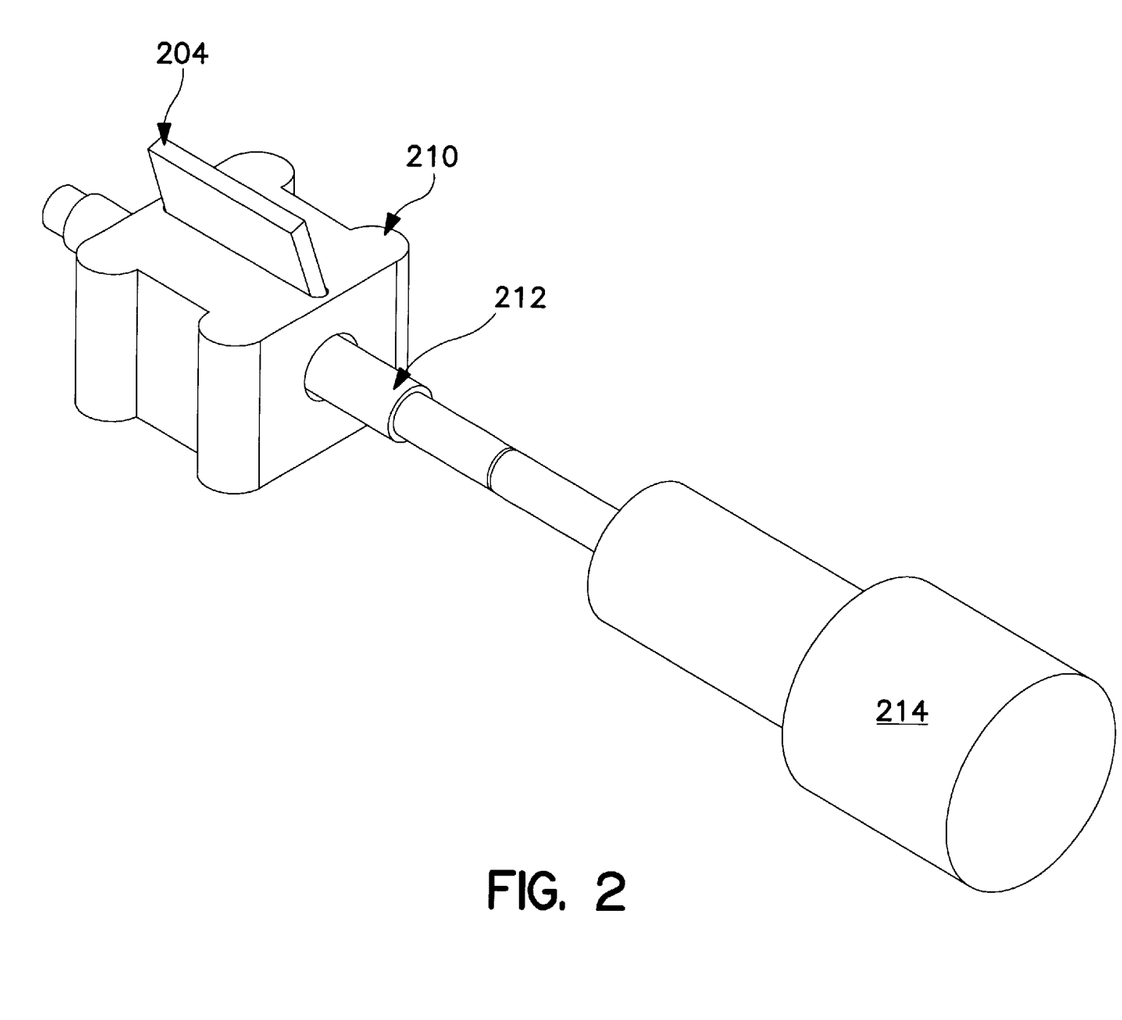
FIG. 2 is a partial enlarged view of the ND filter, the nut and the lead screw of FIG. 1.

The ND filter 204 is seated on a nut 210 which is mechanically connected to a lead screw 212 which links to a step motor 214 located in the case 216 beside the substrate 208.

Figure 3:
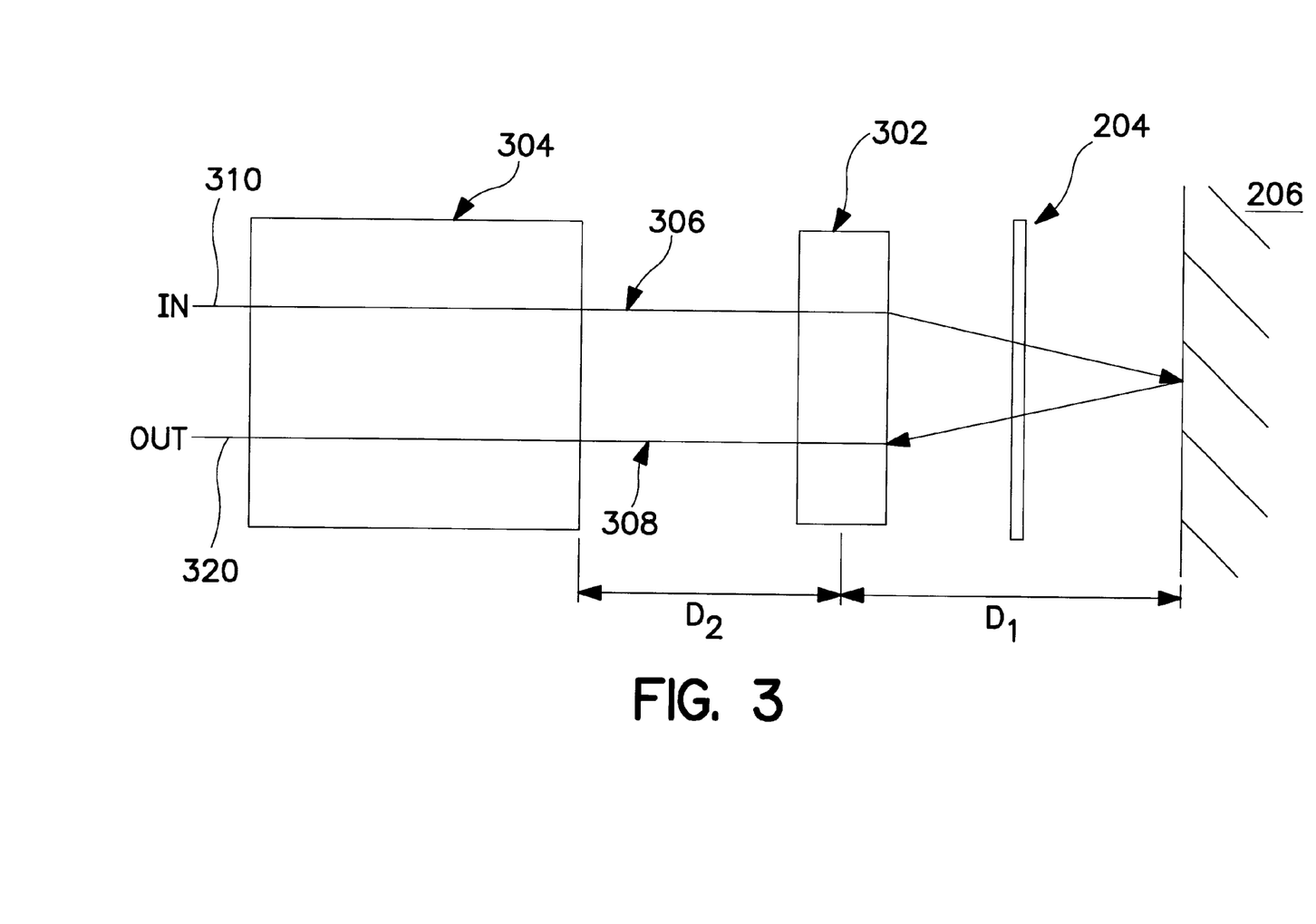
FIG. 3 is a diagram showing roughly the optical signal path in FIG. 1.

The collimator 202 includes a dual fiber ferrule 304 with the input fiber 310 and the output fiber 320 therein, and a GRIN lens 302 relatively secured with each other, as shown in FIG. 3.

Therefore, the input optical signal 306 passes the input fiber 310 of the dual fiber ferrule 304, the GRIN lens 302, the ND filter 204, and coincides on the high reflection broad band mirror 206. Correspondingly, the reflected signal 308 backwardly passes through the ND filter 204, the GRIN lens 302 and enters the outer fiber 320 in the dual fiber ferrule 304.

Understandably, similar to the aforementioned two copending applications with the same assignee, in the instant application the ND filter 204 is moveably linearly intercept between the collimator 202 and the mirror 206 by cooperation of the step motor 214, the lead screw 212 and the nut 210, for attenuation.

Figure 4:
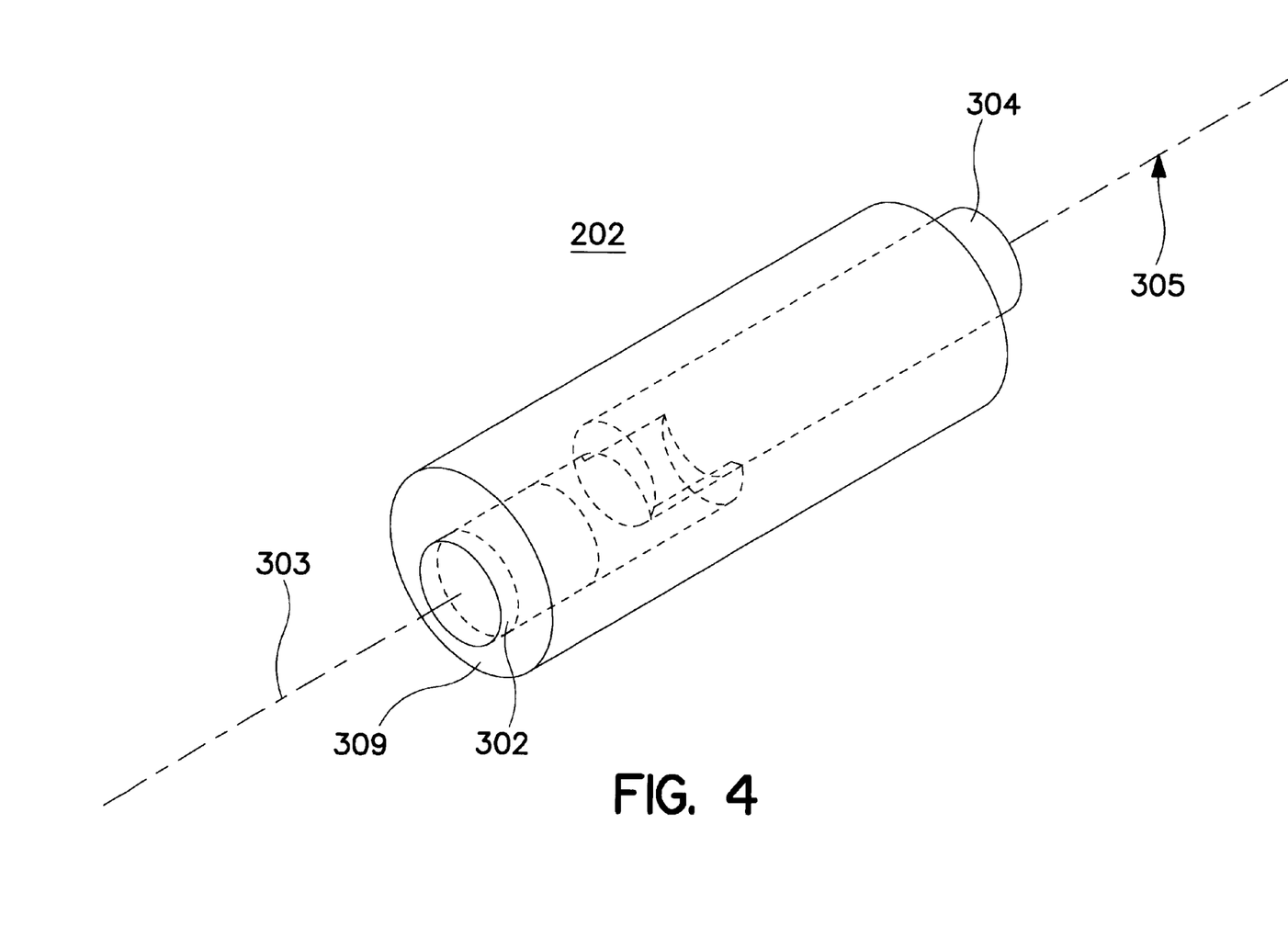
FIG. 4 is a perspective view of the collimator to show the offset arrangement between the axis of the GRIN lens and that of the ferrule of FIG. 1.

FIG. 4 shows the sleeve 309 encloses the GRIN lens 302 and the ferrule 304 wherein the center axis 303 of the GRIN lens 302 is laterally offset from the center axis 305 of the ferrule 304. This is a feature of the invention, and will be illustrated with reasons later.

Figure 5:
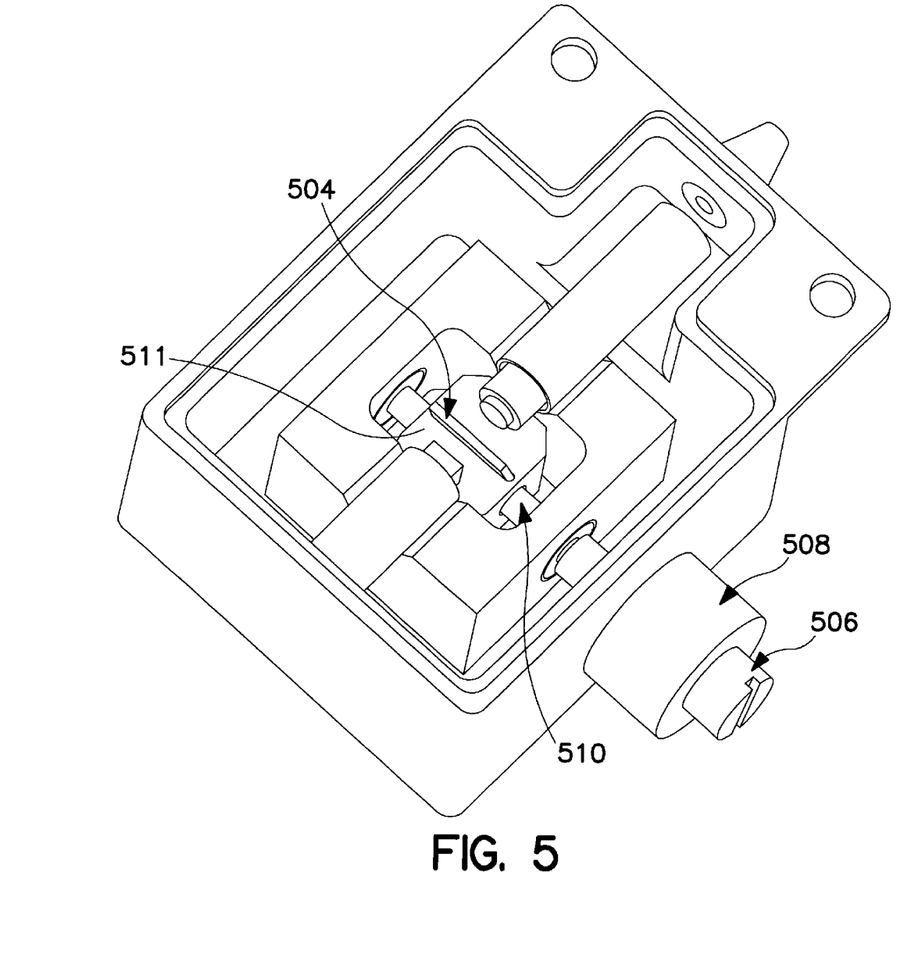
FIG. 5 is a diagram of another embodiment of the variable optical attenuator according to the invention.
Figure 6:
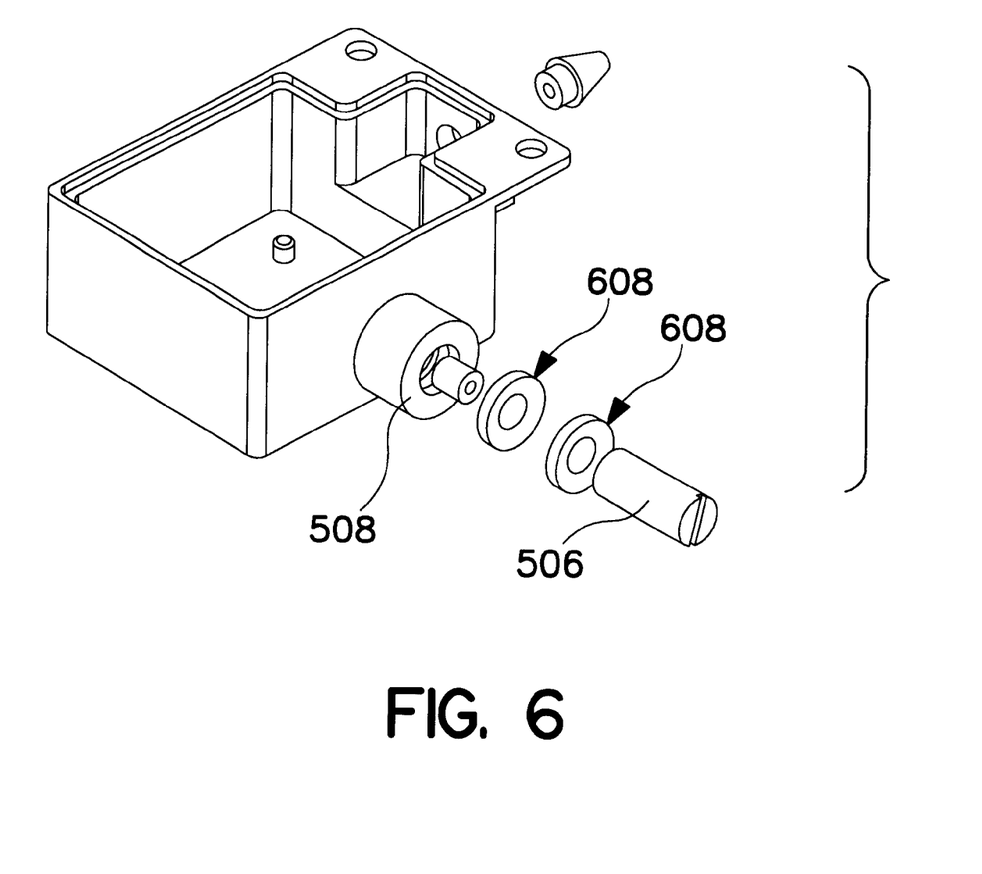
FIG. 6 is a schematic diagram of the O-rings, the screw drive and the case.

FIGS. 5 and 6 show another embodiment of the invention wherein the ND filter 504 is also mounted to a nut 511 actuated by the screw lead 510 which is further linked to an adjustable screw driver 506. The screw driver 506 can be installed to the case knob 508 via a pair of O-rings 608 as shown in FIG. 6.

Several features are provided in the invention.

(1) In comparison with the two aforementioned copending applications in which the ND filter is directly coated with a high reflection layer; on the surface facing to the collimator, thus resulting in instability due to oscillation of motor motion, oppositely in the invention the reflection mirror 206 is immoveably mounted in the attenuator 200, and spaced from the ND filter 204 and at the opposite side of the ND filter 204 relative to the collimator 202. The securement of the mirror in the invention assures stability of the attenuation.

(2) In the invention, because the reflecting mirror 206 is disposed distantly from the ND filter 204, it is arranged to have the mirror 206 is located around the focal point of the GRIN lens 302, where the focal length is $D_1$ for precisely and fully reflecting the signals thereof with the GRIN lens 302 functioning as a converging lens.

(3) Different from the prior art which generally has the ferrule and the GRIN lens closely attached to each other for easily controlling the transmitted signal path, oppositely in the invention, to comply/cooperate with distance $D_1$ between the GRIN lens 302 and the mirror 206, the spacing/distance between the GRIN lens 302 and the ferrule 304 of the collimator 202 is correspondingly dimensioned as $D_2$ wherein $D_1 \approx D_2$. The reason is that in the invention, the reflecting mirror 206 and the ferrule 304 are arranged to be placed about both focus points (front focus and back focus) of the GRIN lens 302 wherein the GRIN lens 302 may function as a converging lens to have the incoming/forward light converging on the mirror 206 at a point where a center axis of the GRIN lens 302 passes, while simultaneously the reflecting/backward light from the mirror 206 may be directed in a parallel manner to be guided to the fiber end in the ferrule 304.

(4) Different from the prior art which generally has the center axis of the ferrule aligned with the center axis of the GRIN lens, in the invention because the ferrule 304 and the GRIN lens 302 is spaced from each other with a significant distance $D_2$, the center axis of the dual fiber ferrule and the center axis of the GRIN lens are intentionally laterally offset from each other to optimize the optical path due to the existing 8 degrees of the GRIN lens 302 and the ferrule 304. Understandably, this lateral offset is linearly proportion to the distance $D_2$. It is noted that FIG. 3 is only a rough sketch without precisely/clearly showing such an offset and shift of the signal paths thereof, while FIG. 4 does a little bit exaggeratedly.

(5) In the invention, the ND filter is tilted for lowering the PDL (Polarization Dependent Loss).

Therefore, in comparison with the aforementioned prior art designs, the invention has the following advantages:

(1) In U.S. Pat. No. 5,745,634, the variable optical attenuator requires two collimators. In opposite, the invention only need one, thus reducing the manufacturing cost.

(2) In the copending application Ser, No. 09/174,367, the in-and-out fibers are placed on both sides of the whole package case, It may bring some inconvenience of mounting VOA on the system board since the customer needs to create more space for taking care of both side fibers. Understandably, this makes it difficult to design the compact system board. The invention solves this problem by using dual fiber collimator whereby the in-and-out fibers are placed on the: same side of the VOA package.

(3) The invention is of a low PDL (Polarization Dependent Loss) design. As noted, PDL is caused by the difference of the P light and the S light after transmitting the ND filter. Because the attenuation changes 20 dB along the 4 mm length of the filter, the metal material coating causes/requires a tiny wedge on the glass plate. Thus, this wedge plate is essentially a polarization dependent device. Generally, PDL is more than 0.3 dB.

Figure 7:
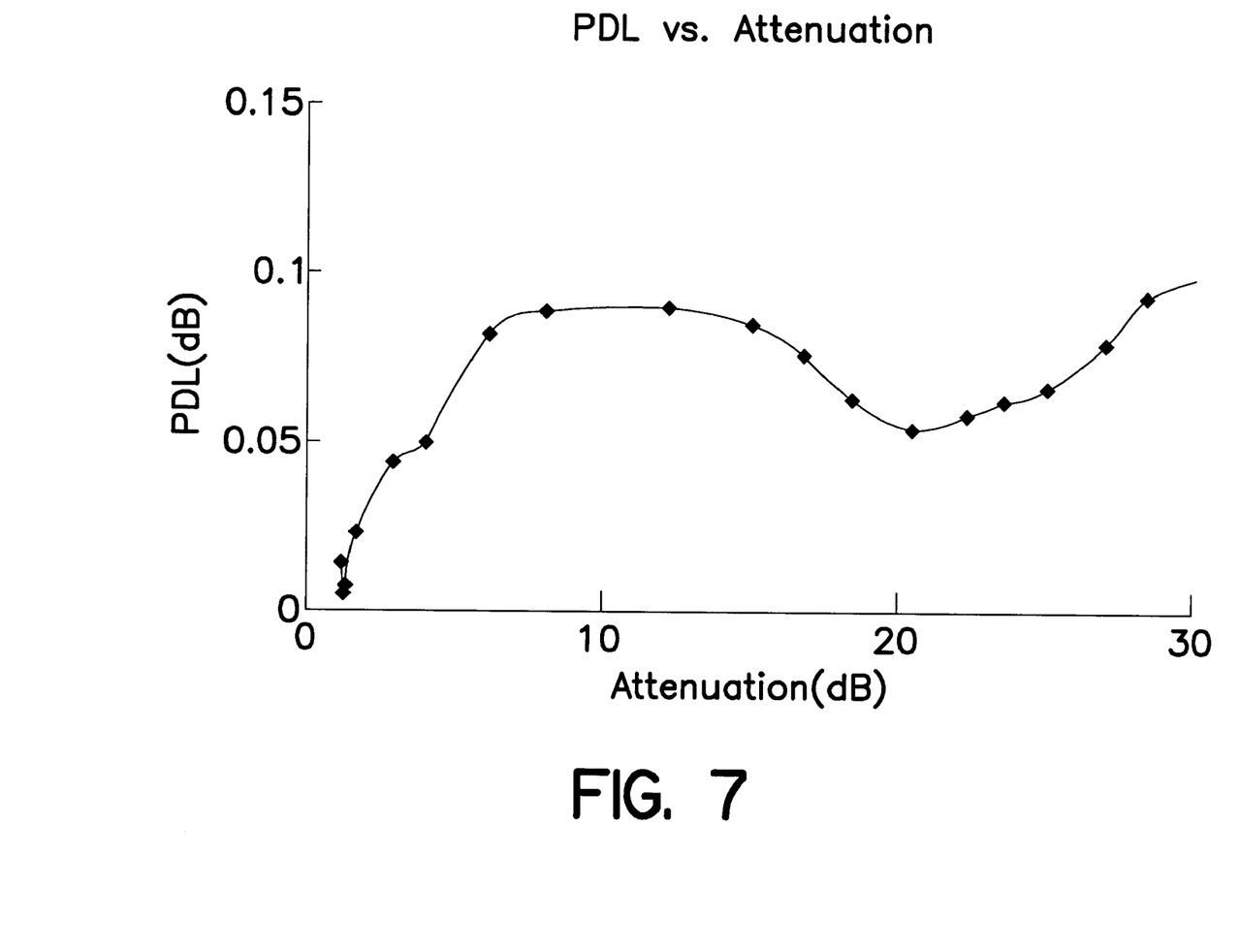
FIG. 7 is a diagram to show the relation between the PDL and the attenuation of the invention.

The copending application Ser. No. 09/255,915 uses an extra glass slab between the ND filter and the dual fiber collimator to compensate PDL due to the ND filter, thereby increasing the insertion loss of the device and complicating the structures thereof. In opposite, in our invention the lower PDL is obtained by only tilting the ND filter within preferably a 5–20 degrees range, and particularly at a 11 degrees angle. Therefore, there is no need to use an extra glass slab for PDL compensation. FIG. 7 shows in the invention the PDL is less than 0.1 dB for attenuation up to 30 dB.

(4) The two O-rings 608 tightly seal the gap between the screw driver 506 and the VOA box for protecting the VOA from moisture attach and enhancing the reliability.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Therefore, person of ordinary skill in this field are to understand that all such equivalent structures are to be included in the scope of the following claims.

We claim:

1. A dual fiber variable optical attenuator comprising:
   a dual fiber collimator, a reflection mirror, and a filter disposed therebetween;
   said dual fiber collimator including:
      a dual fiber ferrule enclosing input and output fibers therein; and
      a GRIN lens spaced from said ferrule with a first distance; wherein
         an center axis of said ferrule is laterally offset from an center axis of said GRIN lens with a second distance.

2. The attenuator as described in claim 1, wherein both said collimator and said reflection mirror are immovable while said filter is movable.

3. The attenuator as described in claim 1, wherein the reflection mirror is spaced from said GRIN lens with another distance equal to a focal length of said GRIN lens.

4. The attenuator as described in claim 1, wherein the first distance is equal to a focal length of said GRIN lens.

5. The attenuator as described in claim 1, wherein said first distance is generally equal to a focal length of said GRIN lens, and the reflection mirror is spaced from one side of said GRIN lens with another distance being also generally equal to said focal length of said GRIN lens.

6. The attenuator as described in claim 1, wherein said second distance is in linear proportion with regard to said first distance.

7. The attenuator as described in claim 1, wherein said filter is tilted relative to GRIN lens.

8. The attenuator as described in claim 1, wherein an angle with which the filter is titled, is with a 5–20 degrees range.

9. A dual fiber variable optical attenuator comprising:

a dual fiber collimator;

a filter and a reflection device disposed by one side of said collimator;

said dual fiber collimator including:
   a dual fiber ferrule enclosing input and output fibers therein; and
   a GRIN lens spaced from the ferrule in an axial direction of said collimator; wherein
      an center axis of said GRIN lens is laterally offset from another center axis of said ferrule with a first distance.

10. The attenuator as described in claim 9, wherein said first distance is in linear proportion with regard to a second distance defined between said ferrule and said GRIN lens.

11. The attenuator as described in claim 10, wherein said second distance is equal to a focus length of said GRIN lens.

12. The attenuator as described in claim 9, wherein said reflection device, is spaced from said filter rather than closely attached thereto.

13. The attenuator as described in claim 12, wherein said reflection device is spaced from said GRIN lens with a distance equal to a focal length of said GRIN lens.

14. The attenuator as described in claim 10, wherein said filter is tilted with regard to said GRIN lens.

15. A dual fiber collimator comprising:

a dual fiber ferrule enclosing input and output fibers therein; and a GRIN lens axially spaced from said ferrule with a first distance; wherein
   an center axis of said GRIN lens is laterally offset from an center axis of said ferrule with a second distance.

16. The collimator as described in claim 15, wherein said second distance is in linear proportion with regard to said first distance.

17. The collimator as described in claim 15, wherein said first distance is equal to a focal length of said GRIN lens.

18. The collimator as described in claim 15, wherein a sleeve axially encloses both said ferrule and said GRIN lens therein.

19. A method of attenuating a light signal, comprising the steps of:

providing a collimator with a ferrule having input and output fibers therein, and a GRIN lens;

spatially positioning said ferrule and said GRIN lens with a first distance in an axial direction thereof; and spatially positioning said ferrule and said GRIN lens with a second distance in an lateral direction thereof, whereby an insertion loss on the output fiber due to an existing angle of said ferrule and said GRIN lens, can be lowered.

* * * * *